United States Patent
Romanek et al.

(10) Patent No.: US 7,774,826 B1
(45) Date of Patent: Aug. 10, 2010

(54) SYSTEM AND METHOD FOR DETERMINING EFFECTIVE POLICY PROFILES IN A CLIENT-SERVER ARCHITECTURE

(75) Inventors: David A. Romanek, Payson, UT (US); Ty Ellis, Elk Ridge, UT (US); Matthew E. Lewis, Mapleton, UT (US); Daniel E. Montroy, Sandy, UT (US); David Michael Lakis, Salt Lake City, UT (US); Farzad Esfarjani, Sandy, UT (US); Ken W. Muir, Highland, UT (US)

(73) Assignee: Novell, Inc., Provo, UT (US)

( * ) Notice: Subject to any disclaimer, the term of this patent is extended or adjusted under 35 U.S.C. 154(b) by 1268 days.

(21) Appl. No.: 11/108,766

(22) Filed: Apr. 19, 2005

Related U.S. Application Data

(60) Provisional application No. 60/662,792, filed on Mar. 18, 2005.

(51) Int. Cl.
*G06F 7/04* (2006.01)
*G06F 15/16* (2006.01)
*G06F 17/30* (2006.01)
*H04L 29/06* (2006.01)

(52) U.S. Cl. ................................. 726/3; 726/1; 726/4
(58) Field of Classification Search .............. 726/1, 726/3, 4
See application file for complete search history.

(56) References Cited

U.S. PATENT DOCUMENTS

| | | | |
|---|---|---|---|
| 6,965,968 B1 * | 11/2005 | Touboul | 711/118 |
| 7,269,727 B1 * | 9/2007 | Mukherjee et al. | 713/160 |
| 2002/0083073 A1 * | 6/2002 | Vaidya et al. | 707/102 |
| 2004/0047348 A1 * | 3/2004 | O'Neill | 370/389 |

* cited by examiner

*Primary Examiner*—Kambiz Zand
*Assistant Examiner*—Jason K Gee
(74) *Attorney, Agent, or Firm*—Pillsbury Winthrop Shaw Pittman LLP

(57) ABSTRACT

A system and method for determining effective policy profiles, is presented herein. The system includes one or more client devices configured to initiate a request for at least one effective policy profile, a server mechanism communicatively coupled to the one or more client devices and configured to receive the request for the at least one effective policy profile and determine the at least effective policy profiles for each of the requesting one or more client devices, and a policy data storage component communicatively coupled to the server mechanism and configured to store a plurality of policy profiles. The plurality of plurality of policy profiles includes an association between each of the one or more client devices and one or more of the plurality of policy profiles.

25 Claims, 7 Drawing Sheets

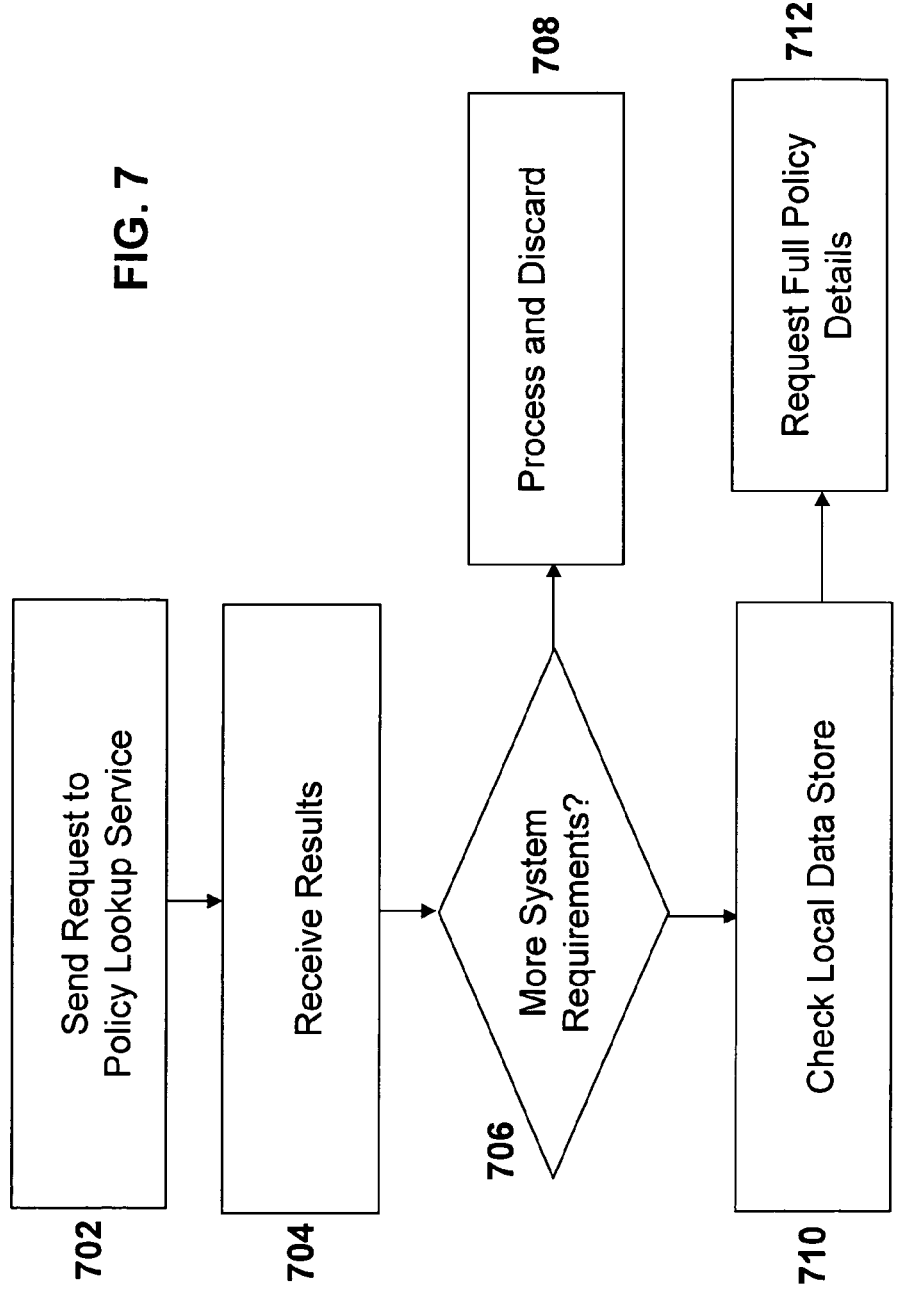

SYSTEM AND METHOD FOR DETERMINING EFFECTIVE POLICY PROFILES IN A CLIENT-SERVER ARCHITECTURE

CROSS REFERENCE TO RELATED APPLICATIONS

This application claims the benefit of U.S. Provisional Patent Application Ser. No. 60/662,792, filed Mar. 18, 2005, entitled "System and Method for Determining Effective Policy. Profiles in a Client-Server Architecture," the contents of which are hereby incorporated by reference in their entirety.

FIELD OF THE INVENTION

The present invention generally relates to networks and systems and methods for providing policy profile information.

BACKGROUND OF THE INVENTION

Service-based functionality is commonly employed in networked environments utilizing client-server architectures. Such functionality enables users to store various subsets of information at different locations, rather than storing all the information on a single computer. In this manner, client devices that are connected to the network are capable of accessing the information as needed.

To this end, "policy profiles" are often implemented to manage the services that a client device may wish to access. Policy profiles may define settings, configurations, and/or attributes related to a user, workstation, group of workstations, or other client device that may be connected to the network.

Generally, determining which policy profiles are required or effective for a given client device has been the responsibility of the client device itself. In traditional systems, a client device may query a server which maintains policy profile information for a plurality of client devices. The policy information may be stored within different components of the server. Thus, a client device desiring to obtain its policy information would query each component to determine whether the component contains policy profiles relevant to the device. The client device would then assemble the policy information obtained from each component, and subsequently perform a series of computations to determine which policy profiles are effective for its configuration.

A problem associated with this traditional approach is that the effective policy profile computations are often repeated. That is, many client devices perform the same set of computations to determine their effective policy profiles. In addition, multiple processes within a single client device may need to perform the same computations, adding to the redundancies and ultimately wasting processing time and resources. Furthermore, should any problems associated with the policy profile information and/or computations arise, such problems would have to be corrected at each individual client device.

These and other drawbacks exist.

SUMMARY OF THE INVENTION

A system and method for determining effective policy profiles, is presented herein. The system includes one or more client devices configured to initiate a request for one or more policy profiles, a server mechanism communicatively coupled to the one or more client devices and configured to receive the request for one or more policy profiles and determine the one or more policy profiles for each of the requesting one or more client devices, and a policy data storage component communicatively coupled to the server mechanism and configured to store a plurality of policy profiles. The plurality of policy profiles includes an association between each of the one or more client devices and one or more of the plurality of policy profiles.

According to some embodiments of the invention, the server mechanism may receive a request from a client device to provide at least one effective policy, determine whether the at least one effective policy profile is stored in a local cache, and if the at least one effective policy profile is stored in the local cache, the server mechanism may return the at least one effective policy profile to the client devices. If the at least one effective policy profile is not stored in the local cache, the server may access the policy data storage component to retrieve at least one policy profile associated with the client device, determine whether the at least one policy profile is effective for the client device, and return at least one effective policy profile to the client device.

The server mechanism may include a policy lookup service configured to retrieve at least one policy profile associated with a client device and determine whether the at least one policy profile describes an effective policy for the client device. The server mechanism may also include a local cache configured to maintain a list of one or more recently requested policy profiles.

The one or more client devices may each include a policy manager configured to interface with the server mechanism to obtain one or more effective policy profiles by initiating remote procedure calls to the server mechanism. Each client device may also include a local data storage mechanism configured to store at least one policy profile that is currently effective on the client device.

BRIEF DESCRIPTION OF THE DRAWINGS

FIG. 7 illustrates a process associated with a client device, in accordance with an embodiment of the present invention.

DETAILED DESCRIPTION OF PREFERRED EMBODIMENTS

According to various embodiments of the invention, a system and method are provided for determining effective policy profiles for a device in a client/server network architecture. A policy profile may be effective if it is required or germane to the functionality of a particular client device and, depending on the device applications or intended operations, a client device may have one or more effective policy profiles.

To improve the processing of effective policy profiles for one or more client devices, embodiments of the present invention contemplate shifting the effective policy profile determination functionality to the server. That is, the server may be configured to perform the effective policy computations for one or more client devices.

With this server configuration, a client device desiring to update its effective policy profile may send a request to the server to determine which profiles are effective for its intended applications or operations. The client device may present identification information to the server to enable the server to consult a repository of policy profile information (i.e., a policy data store) and determine the effective policy profiles for the client device. As such, rather than interfacing directly to the data store itself, the client device is able to send queries to the server to retrieve the policy information, thereby avoiding the need for the client device to know, a priori, what formats the policy profile information is stored in.

Figure 1:
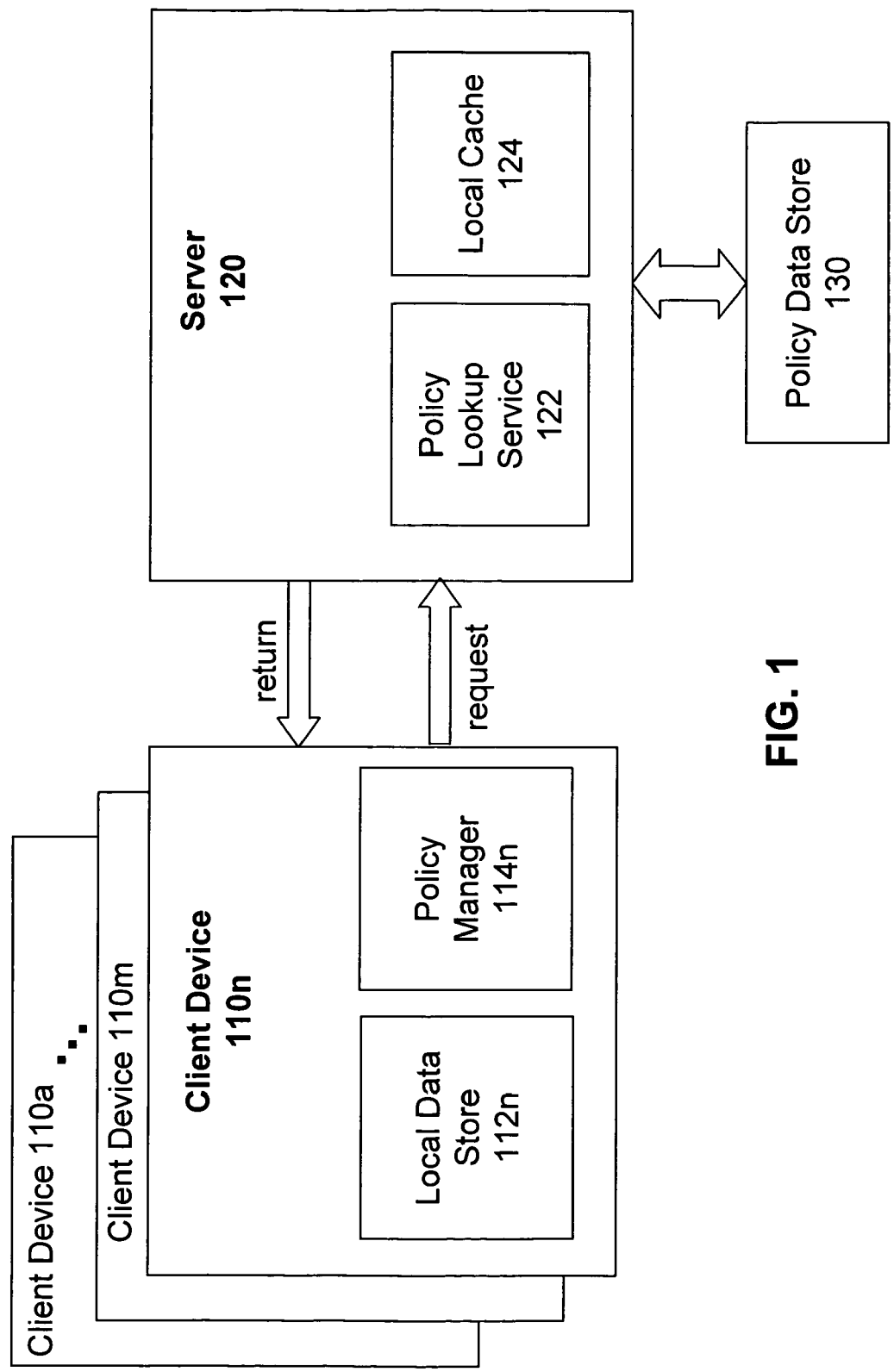
FIG. 1 illustrates a client-server network system, in accordance with an embodiment of the present invention.

In accordance with various embodiments of the present invention, system 100 is presented in FIG. 1. System 100 represents one or more client devices 110a-110n communicatively coupled to a server 120 via a client-server network infrastructure.

Client device 110n may comprise any networked device such as, for example, a desktop or laptop computer, a PDA, a Blackberry, a wireless or cellular phone, and/or any other electronic device capable of accessing a network. Client device 110n may be configured to maintain a local data store 112n where its effective policy profile information may be stored. Local data store 112n may be aware of effective polices even if client device 110n is disconnected from the network. As such, local data store 112n may enforce the effective policies stored therein in the event effective policy profiles may not be obtained from server 120.

As in most networking environments, the policy profile information stored in local data store 112n of client device 110n may need to be periodically updated. For example, an administrator may require that the policy profiles be updated at pre-scheduled times. As another example, the local data store 112n may become corrupt, requiring its contents to be restored. For at least these reasons, client device 110n may be configured with policy manager 114n. Policy manager 114n may be configured to communicate with server 120 to update the effective policy profile information stored in local data store 112n. In one embodiment, policy manager 114n may send requests to server 120 to retrieve effective policy profile information as well as manage the policy profiles received from server 120.

As depicted in FIG. 1, server 120 may include a policy lookup service 122 as well as local cache 124. Policy lookup service 122 may be configured to receive requests from client device 110n to retrieve information relative to device's 110n effective policy profiles. According to some embodiments of the invention, policy lookup service 122 may initially consult local cache 124 to determine whether this information is locally stored. In turn, local cache 124 may be configured to store policy profile information for the most recently requested policy profiles. Such information may be removed by an administrator after a predetermined time interval has elapsed.

In other embodiments, a timer may be included for each entry captured by local cache 124. Policy lookup service 122 may then consult the timer for each requested cache entry to determine whether the entry is older than a predetermined time interval. Policy lookup service 122 may also be configured to communicate with a policy data store 130, which will be described in greater detail below, to retrieve policy profile information that is not included or is not up to date in local cache 124, or may alternatively consult only policy data store 130.

As indicated in FIG. 1, server 120 may also be communicatively coupled to, or integrated with, policy data store 130. As noted above, policy data store 130 represents a repository of policy profile information. As such, policy data store 130 may include settings, configurations, and/or attributes related to a user, workstation, group of workstations, or other networked client devices.

Figure 2:
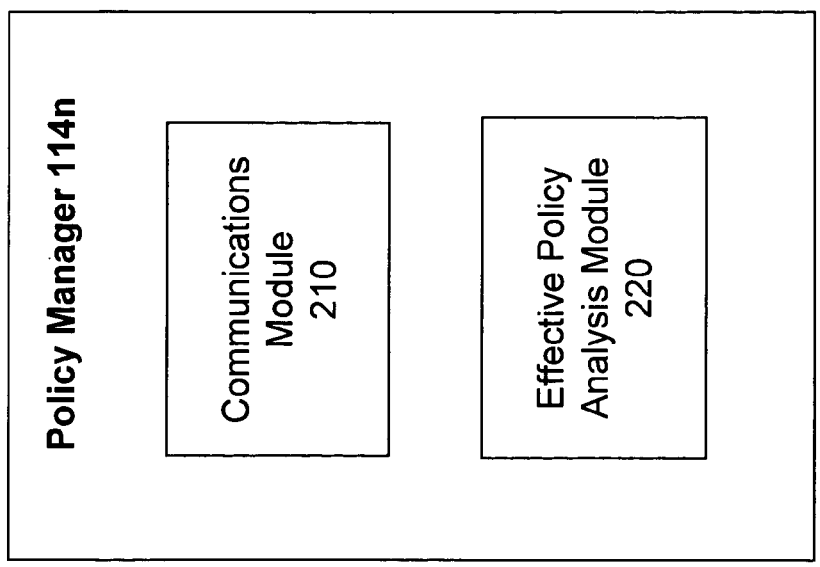
FIG. 2 illustrates a policy manager associated with a client device, in accordance with an embodiment of the present invention.

Returning to client device 110n, policy manager 114n may be responsible for sending requests to server 120 to retrieve effective policy profile information as well as managing the policy profiles received from server 120. As such, policy manager 114n may include one or more modules implementing various embodiments of the present invention to achieve the transmission of requests and the management of the received policy profile information, as depicted in FIG. 2. In one embodiment, policy manager 114n may include communications module 210 that is configured to initiate communications with server 120. For example, communications module 210 may issue a remote procedure call to server 120 requesting that server 210 determine which policy profiles are potentially effective for client device 110n. In some embodiments of the invention, communications module 210 may initiate subsequent procedure calls to request complete effective policy data. Communications between client device 110n and server 120 may use one or more communications protocol standards such as, for example, Simple Object Access Protocol (SOAP), Hyper Text Transport Protocol (HTTP), XMLRPC, and/or other communications protocols.

Policy manager 114n may also include an effective policy analysis module 220. As will be described in further detail below, most computations required to determine a client device's effective policy profiles may be performed at server 120. However, in the event that policy profile information may not be completely computed by server 120, policy analysis module 220 may complete the remaining computations. Effective policy analysis module 220 may retrieve a list of potentially effective policy profiles from server 120. Policy analysis module 220 may analyze each listed item of policy profile information to determine whether the item's effectiveness was fully computed by server 120. If not, policy analysis module 220 may complete the required computations.

Figure 3:
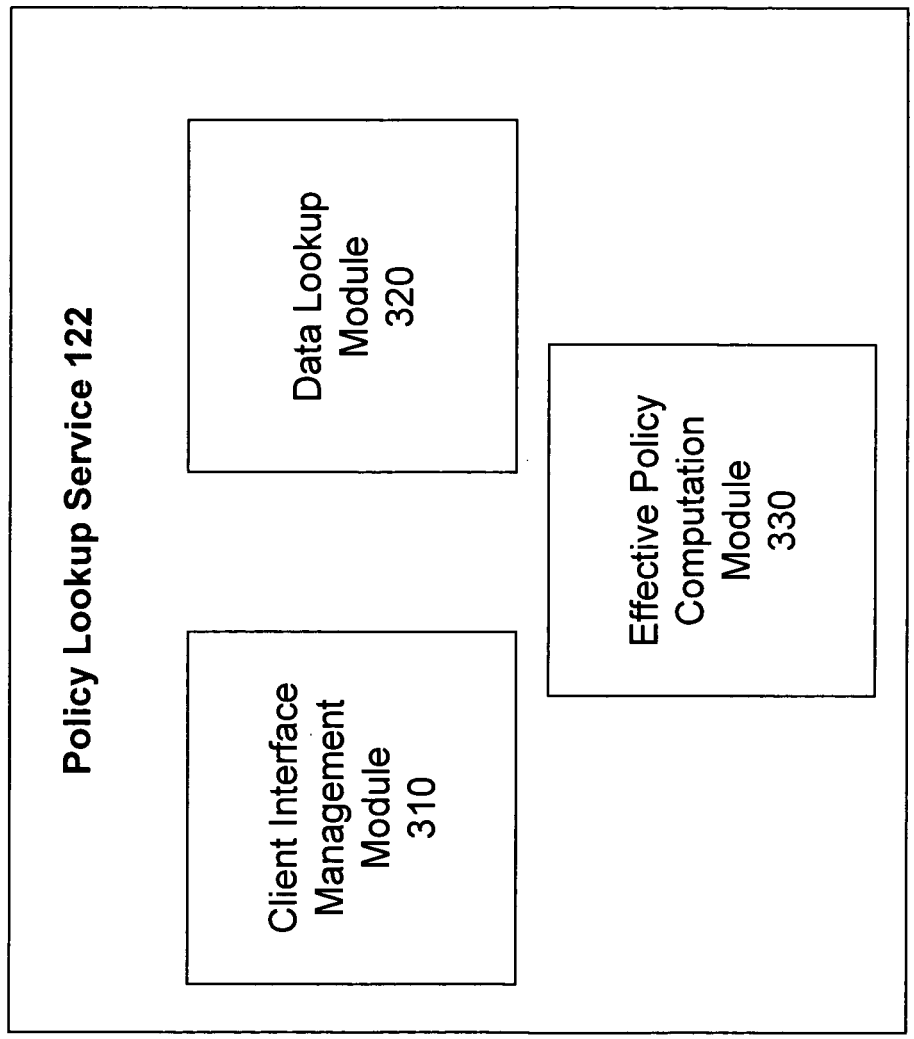
FIG. 3 illustrates a policy lookup service associated with a server, in accordance with an embodiment of the present invention.

As noted above, policy manager 114n may be configured to interface with the policy lookup service 122 of server 120 to obtain policy profile information. As illustrated in FIG. 3, policy lookup service 122 may include a client interface management module 310, a data lookup module 320, and/or an effective policy computation module 330, consistent with various embodiments of the present invention. Client interface management module 310 may be configured to receive and process incoming requests from policy manager 114n of client device 110n to retrieve effective policy profile information. Data lookup module 320 may be configured to search and retrieve policy profile information from local cache 122 and/or policy data store 130. Effective policy computation module 330 may be configured to determine one or more policy profiles that may qualify as effective policies for a requesting client device 110n.

Figure 4:
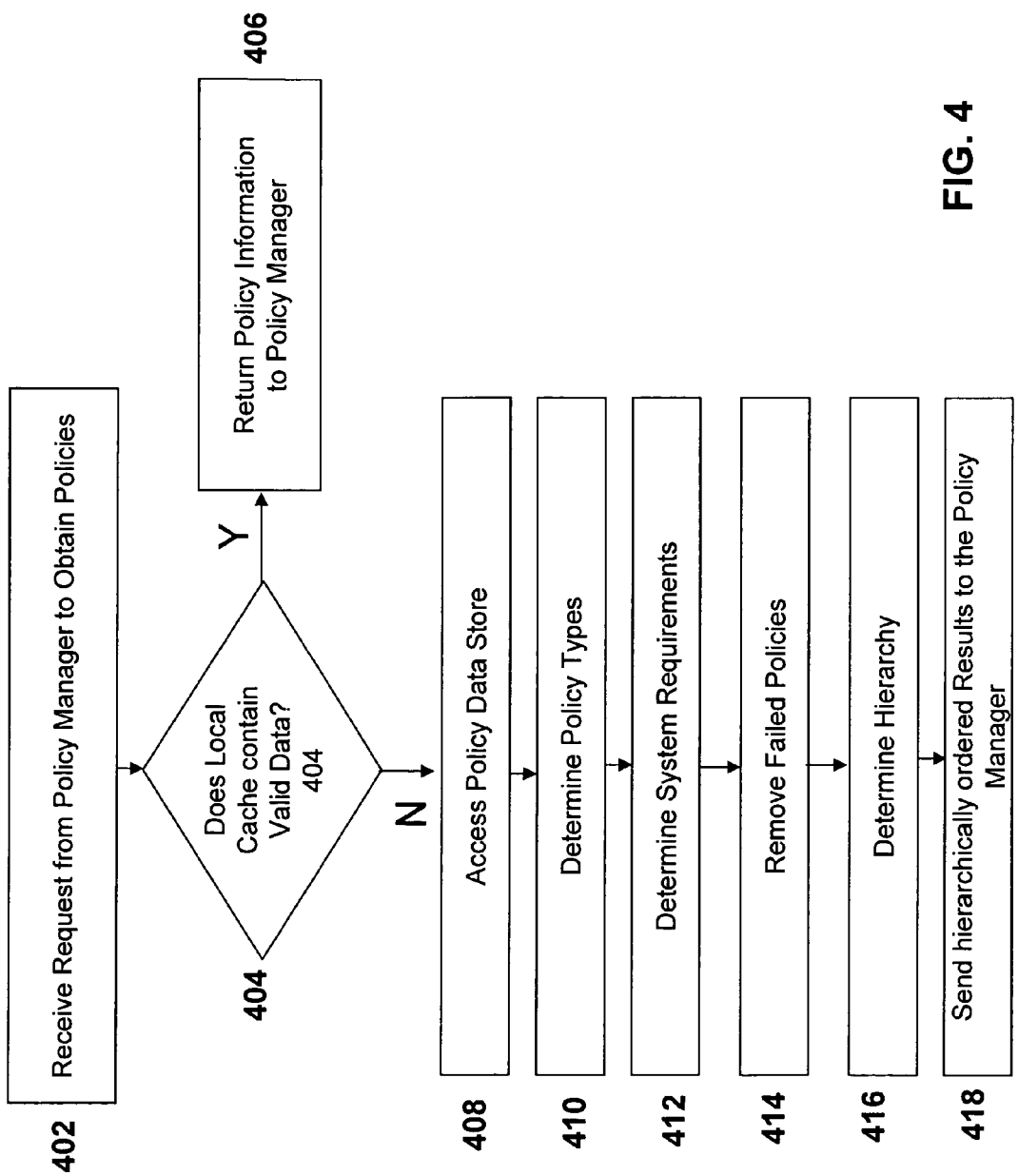
FIG. 4 illustrates a process associated with a server, in accordance with an embodiment of the present invention.

As discussed above, embodiments of the present invention contemplate shifting the effective policy profile determination functionality to the server 120. Consistent with these embodiments, policy lookup service 122 associated with server 120 may be implemented by process 400, as depicted in FIG. 4, to obtain and provide the policy profile information requested by policy manager 114n of client device 110n.

Along these lines, at operation 402 of process 400, policy lookup service 122 may receive a request from policy manager 114*n* of client device 110*n* to determine which policy profiles may be effective for requesting client device 110*n*. As indicated above, each client device 110*n* may be associated with one or more policy profiles. According to some embodiments of the invention, a client device 110*n* may be a part of a group or container and each client device 110*n* within the group or container may be associated with one or more policy profiles. Groups may represent client devices sharing a common attribute, or may be randomly assigned by an administrator. Containers may be used to hold one or more types of other objects. For example, a container may include one or more client devices, groups of client devices, other containers.

The received request may include indicia providing the identity of the requesting client device 110*n*. Indicia may include, for example, a name associated with the device, a group name associated with a group that client device 110*n* belongs to, etc.

Because, as noted above, policy lookup service 122 is associated with server 120 that may also maintain a local cache 124 of recently requested policy profile information, local cache 124 may first be consulted to determine if valid policy profile information is stored in local cache 124, as indicated by operation 404. Policy profile information may be stored as entries in local cache 124 if, for example, the requesting client devices 110*a*-110*i* sent previous requests within a specified amount of time for policy profile information and client device 110*n*, within the same group or container as client devices 110*a*-110*i*, is currently requesting the same or similar policy profile information.

As also noted above, a timer or timeout value may be associated with each cache policy profile information entry to determine whether the entry is older than a predetermined time interval. In this manner, if the policy profile information entry stored in local cache 124 is not older than the predetermined time interval defined by the timer or timeout value, the entry may be deemed as valid policy profile information so that the information may be retrieved from local cache 124 and the information may be returned to client device 110*n*, as depicted by operation 406.

In the event that the policy profile information entry stored in local cache 124 is older than the predetermined time interval, policy lookup service 122 may default to reading the appropriate policy profile information from policy data store 130, as indicated by operation 408. As discussed above, policy data store may maintain a repository of policy profile information, such as, settings, configurations, and/or attributes related to client devices 110*a*-110*n*.

Figure 5:
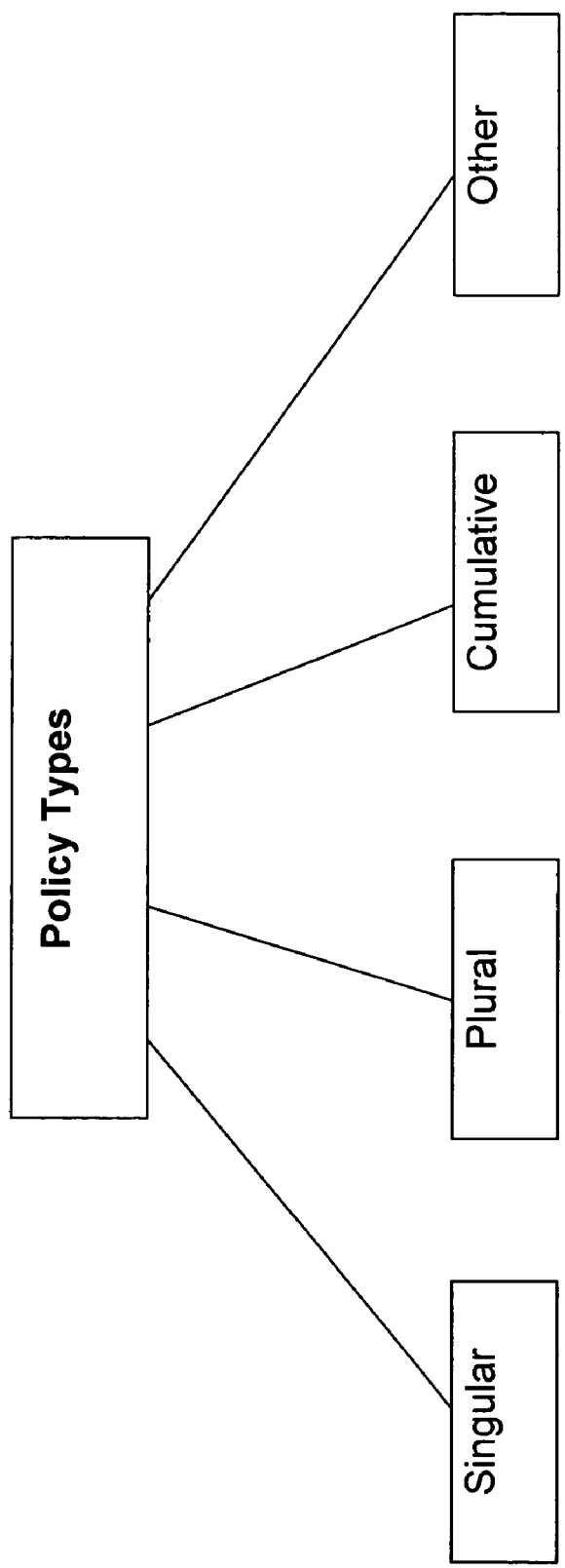
FIG. 5 illustrates a plurality of policy profile types, in accordance with an embodiment of the present invention.

As illustrated at operation 410, for each policy profile associated with requesting client device 110*n*, policy lookup service 122 may determine a policy type. As depicted in FIG. 5, policy types may include, for example, singular policies, plural policies, cumulative policies, and/or other policy types which may be defined. Singular policies may include those policies wherein only one policy may be effective on a client device 110*n* at any given time. As such, the most effective instance of a singular policy may be applied to client device 110*n*.

Plural policies are those policies for which all instances found to be effective may be applied to client device 110*n*. Cumulative policies are those policies for which all instances of the policy found by the effective policy computations may be applied to client device 110*n*. However, the cumulative policies may be applied in reverse order of effectiveness, or closeness, allowing the most effective, or closest policy to be the last policy applied.

Referring back to process 400 of policy lookup service 122, at operation 412, policy lookup service 122 may also determine whether any system requirements are associated with each policy profile and whether these system requirements may be validated for the requesting client device 110*n*. When policy definitions are created by an administrator, the definition may include one or more system requirements that are needed for a client device 110*n* implementing the requested policy profile. System requirements may include, for example, information related to the CPU characteristics, amount of memory, type and/or size of a disk drive, whether any files should exist on the implementing device, and/or other requirements.

Policy lookup service 122 may also determine whether requesting client device 110*n* meets the system requirements associated with a policy profile. However, server 120 may not have all information needed to fully evaluate each system requirement. For example, server 120 may not know whether a requesting client device 110*n* has a necessary file stored on it. In accordance with some embodiments of the invention, policy lookup service 122 may be configured to remove policy profiles from a list of potential effective policy profiles that have failed to meet at least one system requirement, as depicted by operation 414. In other embodiments of the invention, policy lookup service 122 may issue a request to the client to determine whether a system requirement that the policy lookup service is unable to validate can be met by the client.

Once policy lookup service 122 has created a list of potentially effective policy profiles for requesting client device 110*n*, a hierarchy in which the policy profiles should be applied may be determined by policy lookup service 122, as depicted by operation 416. Policy profiles may be implemented based on their hierarchal closeness to requesting client device 110*n*.

Figure 6:
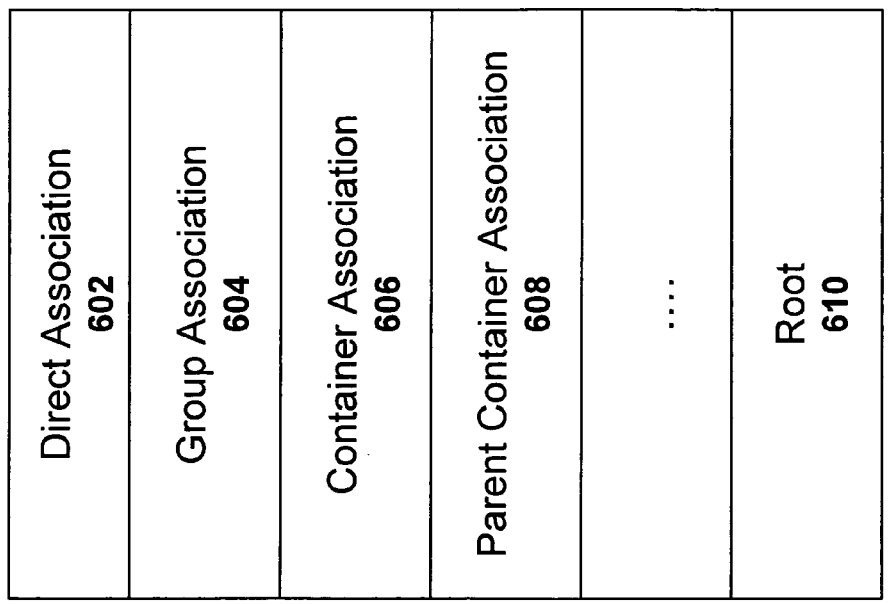
FIG. 6 illustrates an associative hierarchy of client devices, in accordance with an embodiment of the present invention.

For example, FIG. 6 depicts an exemplary hierarchy which may be employed by policy lookup service 122 in determining which policy profiles should be implemented. As depicted at 602, policy profiles that are directly associated with requesting client device 110*n* may be implemented first. As illustrated at 604, policy profiles associated with a group to which the requesting client device 110*n* belongs may be the next choice. Policy profiles associated with a container which contains the requesting client device 110*n* may then be implemented, as depicted at 606. A container may contain other containers, which may contain groups, which may contain client devices. As such, this hierarchy is followed to the root of the policy data store 130, as depicted at 608-610. With this said, it will be appreciated that other customized hierarchies may be employed by policy lookup service 122.

Referring back to process 400, policy lookup service 122 may return a list of hierarchically ordered and potentially effective policy profiles to requesting client device 110*n*, as depicted at 418. If one or more singular policy profiles are located while processing the list of potentially effective policy profiles, the singular policy having the closest hierarchical distance to the requesting device is returned. For cumulative policy profiles, the singular cumulative policy and its cumulative prerequisites may be provided as effective policy profiles. For plural policy profiles, all effective policy profiles may be provided. The list of potentially effective policy profiles may include, for example, the name of the policy profile, the policy profile type, any remaining system requirements that have not been validated, the current version number of the policy profile, and/or other information.

As discussed above, policy lookup service 122 of server 120 operates to provide effective policy profiles in response to requests from policy manager 114n of client device 110n. As such, in accordance with various embodiments of the present invention, FIG. 7 illustrates process 700 that may be executed by client device 110n in initiating such requests and managing the policy profile information. As depicted at operation 702, a request may be sent by policy manager 114n of client device 110n to server 120 requesting a list of potentially effective policy profiles that may be implemented by requesting client device 110n. After the request is processed by policy lookup service 122 of server 120, policy lookup service 122 returns the results to requesting client device 110n, as depicted by operation 704. Results may include one or more potentially effective policy profiles.

As described above, it is possible that server 120 may be unable to validate every system requirement associated with a policy profile. Thus, as illustrated at operation 706, requesting client device 110n may determine whether it should validate any system requirements. If there are remaining system requirements to be validated, the validation may be performed and any policy profiles for which requesting client device 110n does not meet the system requirements may be removed from the list, as depicted by operation 708.

At operation 710, requesting client device 110n may compare the version number of each policy profile in the returned list of effective policy profiles with the policy profiles stored in the local data store 112n of client device 110n. If the policy profile in the returned list is not a newer version that the locally-stored version, local data store 112n may be deemed as current and processing may cease. However, as indicated by operation 712, if the returned list of policy profiles is a newer version than the locally-stored policy profile, a subsequent procedure call may be made to server 120 to provide updated complete policy profile information to client device 110n.

Other embodiments, uses, and advantages of the invention will be apparent to those skilled in the art from consideration of the specification and practice of the invention disclosed herein. This specification should be considered exemplary only, and the scope of the invention is accordingly intended to be limited only by the following claims.

What is claimed is:

1. A method for determining effective policy profiles in a client-server architecture, comprising:
    receiving a request for an effective policy profile at a server, wherein the server receives the request for the effective policy profile from a client device communicatively coupled to the server via a network;
    retrieving the effective policy profile for the client device at the server, wherein retrieving the effective policy profile for the client device includes:
        determining whether the effective policy profile for the client device is stored in a local cache locally coupled to the server, wherein the local cache stores one or more policy profiles having timeout values that are less than or equal to a predetermined time interval;
        retrieving the effective policy profile for the client device from the local cache in response to determining that the policy profiles stored in the local cache include the effective policy profile for the client device;
        returning, from the server to the client device, the effective policy profile retrieved from the local cache in response to determining that the policy profiles stored in the local cache include the effective policy profile for the client device;
        retrieving a plurality of policy profiles that are effective for the client device from a policy data store that includes a repository integrated with the server in response to determining that the policy profiles stored in the local cache do not include the effective policy profile for the client device;
        returning, from the server to the client device, one of the plurality of effective policy profiles retrieved from the policy data store having a hierarchical distance closest to the client device in response to determining that the policy profiles stored in the local cache do not include the effective policy profile for the client device, wherein the hierarchical distances from the plurality of effective policy profiles to the client device depend on a distance within a hierarchy from the plurality of effective policy profiles to a root of the policy data store.

2. The method of claim 1, wherein the request for the effective policy profile received at the server includes indicia providing an identity of the client device.

3. The method of claim 1, wherein determining whether the effective policy profile for the client device is stored in the local cache includes:
    determining that the policy profiles stored in the local cache include the effective policy profile for the client device in response to the local cache including a policy profile that is effective for the client device, and further in response to the timeout value for the policy profile that is effective for the client device not exceeding the predetermined time interval; and
    determining that the policy profiles stored in the local cache do not include the effective policy profile for the client device in response to the local cache not including a policy profile that is effective for the client device, or in response to the timeout value for the policy profile that is effective for the client device exceeding the predetermined time interval.

4. The method of claim 1, further comprising determining whether the client device meets one or more system requirements associated with the effective policy profile retrieved from the local cache or the plurality of effective policy profiles retrieved from the policy data store, wherein the server returns to the client device the effective policy profile retrieved from the local cache or the effective policy profile retrieved from the policy data store that has the hierarchical distance closest to the client device in response to determining that the client device meets the system requirements.

5. The method of claim 1, further comprising determining a policy type for the effective policy profile retrieved from the local cache or the plurality of effective policy profiles retrieved from the policy data store, wherein the client device applies the effective policy profile returned from the local cache or the effective policy profile returned from the policy data store based on the policy type.

6. The method of claim 1, further comprising hierarchically ordering the plurality of effective policy profiles retrieved from the policy data store based on the hierarchical distances from the plurality of effective policy profiles to the client device.

7. The method of claim 6, wherein the server first returns to the client device one of the plurality of hierarchically ordered effective policy profiles that are directly associated with the client device, next returns one of the plurality of hierarchically ordered effective policy profiles that are associated with a group to which the client device belongs, and next returns one of the plurality of hierarchically ordered effective policy profiles that are associated with a container that contains the group to which the client device belongs.

8. The method of claim 1, wherein the effective policy profile returned to the client device from the local cache or the policy data store includes one or more of a name, a type, a version, or one or more system requirements that have not been validated.

9. The method of claim 7, wherein the effective policy profile directly associated with the client device has the closest hierarchical distance to the client device, the effective policy profile associated with the group to which the client device belongs has a second closest hierarchical distance to the client device, and the effective policy profile associated with the container that contains the group to which the client device belongs has a third closest hierarchical distance to the client device.

10. The method of claim 6, further comprising removing one or more of the hierarchically ordered effective policy profiles in response to the client device failing to meet at least one system requirement associated with the one or more hierarchically ordered effective policy profiles.

11. The method of claim 6, further comprising locating a subset of the plurality of hierarchically ordered effective policy profiles having a singular policy type, wherein the server returns to the client device one of the hierarchically ordered effective policy profiles in the located subset having the closest hierarchical distance to the client device.

12. The method of claim 1, wherein the client device communicates the request for the effective policy profile to the server at a pre-scheduled time or in response to a local data store at the client device becoming corrupted.

13. A system for determining effective policy profiles in a client-server architecture, comprising:
 a server configured to receive a request for an effective policy profile from a client device communicatively coupled to the server via a network;
 a local cache locally coupled to the server, wherein the local cache is configured to store one or more policy profiles having timeout values that are less than or equal to a predetermined time interval; and
 a policy data store integrated with the server, wherein the policy data store includes a repository configured to store a plurality of potential effective policy profiles for the client device, and wherein the server is further configured to:
  retrieve the effective policy profile for the client device from the local cache in response to determining that the policy profiles stored in the local cache include the effective policy profile for the client device;
  return, to the client device, the effective policy profile retrieved from the local cache in response to determining that the policy profiles stored in the local cache include the effective policy profile for the client device;
  retrieve a plurality of policy profiles that are effective for the client device from the policy data store in response to determining that the policy profiles stored in the local cache do not include the effective policy profile for the client device; and
  return, to the client device, one of the plurality of effective policy profiles retrieved from the policy data store having a hierarchical distance closest to the client device in response to determining that the policy profiles stored in the local cache do not include the effective policy profile for the client device, wherein the hierarchical distances from the plurality of effective policy profiles to the client device depend on a distance within a hierarchy from the plurality of effective policy profiles to a root of the policy data store.

14. The system of claim 13, wherein the request for the effective policy profile received at the server includes indicia providing an identity of the client device.

15. The system of claim 13, wherein the server is further configured to:
 determine that the policy profiles stored in the local cache include the effective policy profile for the client device in response to the local cache including a policy profile that is effective for the client device, and further in response to the timeout value for the policy profile that is effective for the client device not exceeding the predetermined time interval; and
 determine that the policy profiles stored in the local cache do not include the effective policy profile for the client device in response to the local cache not including a policy profile that is effective for the client device, or in response to the timeout value for the policy profile that is effective for the client device exceeding the predetermined time interval.

16. The system of claim 13, wherein the server is further configured to determine whether the client device meets one or more system requirements associated with the effective policy profile retrieved from the local cache or the plurality of effective policy profiles retrieved from the policy data store, wherein the server returns to the client device the effective policy profile retrieved from the local cache or the effective policy profile retrieved from the policy data store that has the hierarchical distance closest to the client device in response to determining that the client device meets the system requirements.

17. The system of claim 13, wherein the server is further configured to determine a policy type for the effective policy profile retrieved from the local cache or the plurality of effective policy profiles retrieved from the policy data store, wherein the client device applies the effective policy profile returned from the local cache or the effective policy profile returned from the policy data store based on the policy type.

18. The system of claim 13, wherein the server is further configured to hierarchically order the plurality of effective policy profiles retrieved from the policy data store based on the hierarchical distances from the plurality of effective policy profiles to the client device.

19. The system of claim 18, wherein the server first returns to the client device one of the plurality of hierarchically ordered effective policy profiles that are directly associated with the client device, next returns one of the plurality of hierarchically ordered effective policy profiles that are associated with a group to which the client device belongs, and next returns one of the plurality of hierarchically ordered effective policy profiles that are associated with a container that contains the group to which the client device belongs.

20. The system of claim 13, wherein the effective policy profile returned to the client device from the local cache or the policy data store includes one or more of a name, a type, a version, or one or more system requirements that have not been validated.

21. The system of claim 19, wherein the effective policy profile directly associated with the client device has the closest hierarchical distance to the client device, the effective policy profile associated with the group to which the client device belongs has a second closest hierarchical distance to the client device, and the effective policy profile associated with the container that contains the group to which the client device belongs has a third closest hierarchical distance to the client device.

22. A method for determining effective policy profiles in a client server architecture, comprising: receiving, at a server, a request for an effective policy profile from a client device communicatively coupled to the server via a network; retrieving, by the server, a plurality of policy profiles that are effective for the client device from a policy data store integrated with the server in response to determining that a cache locally coupled to the server does not include the requested effectively policy profile; locating a subset of the plurality of effective policy profiles having a cumulative policy type; and returning, from the server to the client device, the plurality of effective policy profiles in the subset having the cumulative policy type, where the client device implements all of the effective policy profiles in the subset returned from the server based on the hierarchical distance to the client device from the effective policy profiles in the subset to the client device, where the hierarchical distances from the effective policy profiles in the subset to the client device depend on a distance within a hierarchy from the effective policy profiles in the subset to a root of the policy data store.

23. A method for determining effective policy profiles in a client server architecture, comprising: receiving, at a server, a request for an effective policy profile from a client device communicatively coupled to the server via a network; retrieving, by the server, a plurality of policy profiles that are effective for the client device from a policy data store integrated with the server in response to determining that a cache locally coupled to the server does not include the requested effectively policy profile; and returning, from the server to the client device, the plurality of effective policy profiles retrieved from the policy data store, wherein the client device implements a subset of the plurality of effective policy profiles returned from the server having a cumulative policy type based on a hierarchical distance from the effective profiles in the subset to the client device, wherein the hierarchical distance from the effective policy profiles in the subset to the client device depend on a distance with a hierarchy from the effective policy profiles in the subset to a root of the policy data store.

24. The method of claim 23, further comprising locating a subset of the plurality of effective policy profiles having a plural policy type, wherein the server returns to the client device all of the effective policy profiles in the located subset, and wherein the one or more effective policy profiles implemented on the client device includes all of the effective policy profiles in the located subset.

25. The method of claim 23, wherein the client device implements all of the effective policy profiles in the subset in a reverse order of closeness to the client device, whereby the client device last implements one of the effective policy profiles in the subset for which the hierarchical distance is closest to the client device.

* * * * *